No. 11,952.
Reissued Nov. 26, 1901.
H. SHOEMAKER.
WIRELESS TELEGRAPH SYSTEM.
(Application filed June 12, 1901).
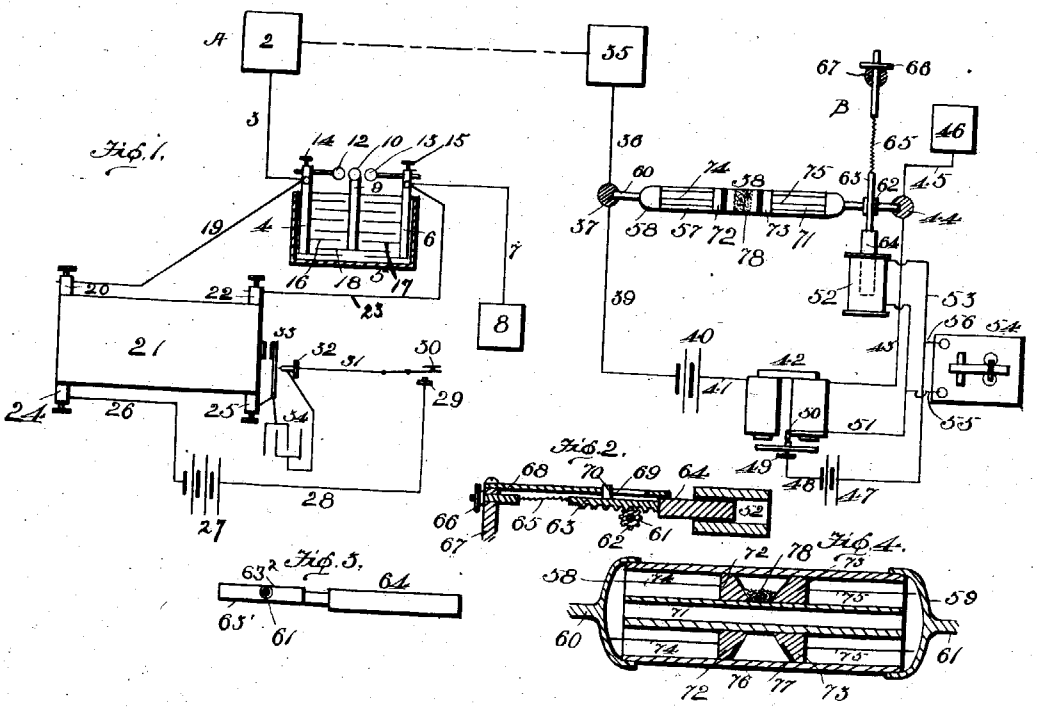
Witnesses
Bernard M. Offutt
A. S. Carson
Inventor
Harry Shoemaker
By David H. Moore, Attorney

UNITED STATES PATENT OFFICE.

HARRY SHOEMAKER, OF PHILADELPHIA, PENNSYLVANIA, ASSIGNOR OF ONE-HALF TO MARIE V. GEHRING, OF PHILADELPHIA, PENNSYLVANIA.

WIRELESS-TELEGRAPH SYSTEM.

SPECIFICATION forming part of Reissued Letters Patent No. 11,952, dated November 26, 1901.

Original No. 671,732, dated April 9, 1901. Application for reissue filed June 12, 1901. Serial No. 64,328.

*To all whom it may concern:*

Be it known that I, HARRY SHOEMAKER, a citizen of the United States, residing at Philadelphia, in the county of Philadelphia and State of Pennsylvania, have invented certain new and useful Improvements in Wireless-Telegraph Systems; and I do declare the following to be a full, clear, and exact description of the invention, such as will enable others skilled in the art to which it appertains to make and use the same.

My invention relates to certain novel improvements in the art of wireless telegraphy; and the object is to improve the construction of the coherer, and thereby increase the efficiency of the receiving apparatus.

To this end the invention consists in the construction, combination, and arrangement of the several elements of the device, as will be hereinafter more fully described, and particularly pointed out in the claims.

In the accompanying drawings the same reference characters indicate the same parts of the invention.

Figure 1 is a plan view, partly in section, of my improved system of wireless telegraphy. Fig. 2 is a vertical section of the coherer-solenoid, taken on the broken line *x x* of Fig. 1. Fig. 3 is a similar view of a modified form of the same. Fig. 4 is an enlarged view, taken longitudinally in a horizontal section, of the coherer proper.

Referring to Fig. 1, the letter A denotes the transmitting-station, and B the receiving-station. At the transmitting-station, 2 designates a conducting plate or radiator suspended overhead at a suitable height and from which a conductor 3 extends downward to the binding-post 4 of the condenser 5, and from the opposite binding-post 6 of the said condenser 5 a conductor 7 extends to a conducting-plate 8, which is buried a sufficient distance in the ground to insure a comparatively perfect earth connection. 9 denotes an intermediate conductor-post on the condenser 5, and its upper end terminates in a conductor-sphere 10, while the upper ends of the posts 4 and 6 are provided with similar spheres 12 and 13, which are adjustably secured to their respective posts by the thumb-screws 14 and 15. The posts 4 and 6 are provided with a series of parallel condenser-plates 16 and 17, and the intermediate post 9 with a corresponding series of interleaved plates 18, and the condenser-casing is charged or filled with any suitable dielectric—such, for example, as a crude or heavy oil. From the condenser-post 4 a conductor 19 extends to one of the "secondary" terminals 20 of the induction-coil or Ruhmkorff coil 21, and from the other secondary terminal 22 a conductor 23 extends to the condenser-post 6, thus placing the said condenser in series with the secondary of the coil 21. 24 and 25 designate the terminals of the "primary" of the coil 21, and from the terminal post 24 a conductor 26 extends to one pole of the battery 27, and from the opposite pole of said battery a conductor 28 extends to the anvil or contact-point 29 of the signaling-key 30, and a conductor 31 extends from the said key to the adjustable contact-screw 32 of the coil-armature 33, which latter is in electrical connection with the primary post 25, and the usual coil-condenser 34 "bridges" the interrupter, as shown. The operation of this transmitter is as follows: When the signal-key 30 is depressed, the battery (27) circuit is closed through the primary of the coil 21, the induced impulses of the secondary being conducted to the opposed poles 4 and 6 of the condenser 5 and also to the air-plate 2 and the ground-plate 8. The impulses being amplified by the condenser 5 are discharged in the form of etheric oscillations or waves at the plate 2 and in which form they reach the receiving instrument, where they are converted into intelligible signals, as will be explained later on.

Referring now to the receiving-station B, 35 denotes the collecting and receiving plate or cylinder, supported overhead to receive the etheric waves emanating from the transmitting-station, and from this said receiving plate or cylinder a conductor 36 extends to the binding-post 37 of the coherer 38, and from said post 37 a conductor 39 extends to the battery 40, from the opposite pole of which a conductor 41 extends to the relay-magnet 42, and from said magnet a conductor 43 extends to the opposite binding-post 44 of the coherer 38, and from this post 44 a conductor 45 extends to the ground-plate 46. It will thus be seen that the coherer 38 is connected in series with the relay-magnet 42. 47 denotes the local battery, from one pole of which a conductor 48 leads to the armature contact-screw 49 of the relay 42, and from the opposite contact-screw 50 a conductor 51 extends to the solenoid 52, and from the opposite pole of the solenoid a conductor 53 connects with the opposite pole of the battery 47. 54 denotes the sounder, the conducting-wires 56 55 of which connect with the local-battery (47) circuit-conductors 53 51, as shown, thus placing the sounder 54 in parallel with the solenoid 52.

Referring now more particularly to the coherer, which consists of a glass tube 57, the ends of which are hermetically closed by the conducting-caps 58 and 59, so that a vacuum may be maintained in the tube, the cap 58 is provided with a conductor-trunnion 60, which has a bearing in the binding-post 37, and the cap 59 is provided with a conductor-shaft 61, which is mounted in the binding-post 44, so that the coherer-tube has a free rotary movement in said posts 37 44. 62 denotes a pinion fixed on the rock-shaft 61, which meshes with the rack-bar 63, forming a continuation of the magnetic core 64, which has a free longitudinal movement in the solenoid 52, and 65 denotes a retractile spring, one end of which is attached to the rack-bar and the other end to the adjusting-screw 66, mounted in the stud-post 67, and a horizontal arm 68 is also mounted on said post, the free end of the said arm being formed with a guide-slot 69 to receive the stud-pin 70, fixed to the rack-bar 63, so as to limit the movement of the bar and core, whereby the rack and pinion will oscillate the coherer-tube on its axis for a purpose to be presently explained. This coherer is of peculiarly novel construction, being provided with an interior axial tube or rod 71, of glass or any suitable non-conducting material, and on it is mounted two opposed inclined-faced conducting-plugs 72 and 73, the plug 72 being electrically connected to the coherer-cap by the duplex conductors 74 74, and the plug 73 by the conductors 75 75 to the cap 59. 76 represents a segmental non-conducting plate inserted in the conical face of the plug 72, and 77 denotes a similar non-conducting plate fixed in the opposed face of the plug 73, and 78 denotes the magnetic particles which are confined between the plugs by the tubes 57 and 71. From this construction it will be observed that when the coherer-tube 57 is in its normal position—and that is when in the position shown in Fig. 1—the circuit is imperfectly completed at this point between the plugs 72 and 73 by the magnetic metallic particles 78 resting by gravity in the pocket formed by the converging faces of the plugs and the tubes; but when the position of the coherer-tube is reversed—as, for example, by the passage of an electrical current through the solenoid, thereby energizing its core and causing the rack and pinion to reverse the position of the coherer-tube—the said conducting particles fall by gravity on the lower or bottom face of the said tube and break or open the circuit at this point, as the said particles are prevented from adhering to the plugs by the non-conducting plates 76 and 77. It is obvious, however, that, generally speaking, a slight movement of the coherer-tube is sufficient to cause the metallic particles to decohere. Hence I contemplate imparting to said tube a very small axial oscillatory motion instead of a complete reversal when rapid transmission is desired. In such an event the non-conducting plates may be omitted.

The operation of the receiving instrument is as follows: The etheric impulse emanating from the transmitter-plate 2 is received by the collecting-plate 35 or cylinder, whence it passes down the conductor 36 to the post 37 and thence through the coherer-tube 39, post 44, and conductor 45 to the ground-plate 46. This operation completes the relay-circuit through the medium of the plugs and the metallic filings or particles, thus energizing the relay, and thereby closing the local or sounder circuit, which in turn energizes the solenoid and sounder, on the latter of which an audible signal is sounded, while the energizing of the solenoid causes it to draw in its core and through the medium of the rack and pinion reverse the position of the coherer-tube or moves the said tube slightly from its normal position, as the case may be, and permit the connecting particles to fall by gravity in the bottom of the tube, or, in the alternative, merely shake the particles, thus breaking the circuit of the relay-battery, which in turn effects the demagnetization of the solenoid and sounder, and as the solenoid-core or plunger is released the spring 65 restores the coherer-tube to its normal position and the metallic particles again imperfectly complete the relay-circuit at this point between the plugs, and thus leaving the instrument in condition to receive another signal.

In the accompanying drawings I have shown my invention in the best form now known to me; but various changes in the details may be made within the skill of a competent mechanic without departing from the spirit of my invention as set forth in the claims. For instance, in Fig. 3 I have shown a modified means for operating the coherer-tube, the rack and pinion being dispensed with and a cord $63^2$ passed around the shaft 61, one end of the cord being attached to the plunger-core and after passing one or more times around the shaft has its opposite end fixed to the free end of the plunger-arm 63', as shown, so that the longitudinal movement of the plunger will impart a rotary movement in said shaft. The operation of this type is the same as that of the well-known "bow-drill," wherein the reciprocation of the frame or handle, corresponding to the core 64 and plunger-arm 63', causes successive portions of the cord, as $63^2$, to wind on and unwind from the shaft, as 61, thereby causing said shaft to oscillate.

Having thus fully described my invention, what I claim as new and useful, and desire to secure by Letters Patent of the United States, is—

1. A coherer for a wireless-telegraph system, comprising the non-conducting tubes, the conducting-plugs, and their connections, the segmental non-conducting plates fixed to the opposite faces of said plugs, the conducting particles interposed between said plugs, and means for reversing the position of said tubes whereby the said conducting particles will be alternately brought into contact with the plugs and their non-conducting plates, substantially as set forth.

2. In a receiver, the combination of air and ground plates, posts connected with said plates, a coherer comprising a tube containing metallic particles, journals attached to the ends of said tube, a relay-circuit connected to said posts, a sounder-circuit operated by the relay-circuit, and electromagnetically-actuated means coöperating with one of said journals to oscillate the coherer and thereby shake the particles.

3. In a wireless-telegraph system, a coherer comprising a tube containing metallic particles, journals attached to ends of said tube, and electrically connected through said particles and electromagnetically-actuated means coöperating with one of said journals, to oscillate the coherer and thereby shake the particles, substantially as and for the purpose set forth.

In testimony whereof I have affixed my signature in the presence of two witnesses.

HARRY SHOEMAKER.

In presence of—
M. WIEGAND,
WM. J. MOSS.